(12) United States Patent
Kummer (10) Patent No.: US 8,959,566 B2
(45) Date of Patent: Feb. 17, 2015

(54) STORING AND READING MULTIPLEXED CONTENT

(75) Inventor: David A. Kummer, Highlands Ranch, CO (US)

(73) Assignee: Echostar Technologies L.L.C., Englewood (*) Notice: Subject to any disclaimer, the term of this patent is extended or adjusted under 35 U.S.C. 154(b) by 163 days.

(21) Appl. No.: 13/294,005

(22) Filed: Nov. 10, 2011

(65) Prior Publication Data

US 2013/0055333 A1  Feb. 28, 2013

Related U.S. Application Data

(60) Provisional application No. 61/526,581, filed on Aug. 23, 2011.

(51) Int. Cl.

| | | |
|---|---|---|
| *H04N 7/173* | (2011.01) | |
| *H04N 21/433* | (2011.01) | |
| *H04N 21/434* | (2011.01) | |
| *H04N 21/4627* | (2011.01) | |

(52) U.S. Cl.
CPC ....... *H04N 21/4334* (2013.01); *H04N 21/4347* (2013.01); *H04N 21/4627* (2013.01)
USPC .................................................. 725/134

(58) Field of Classification Search
None
See application file for complete search history.

(56) References Cited

U.S. PATENT DOCUMENTS

| | | |
|---|---|---|
| 4,706,121 A | 11/1987 | Young |
| 4,723,246 A | 2/1988 | Weldon, Jr. |
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |

(Continued)

FOREIGN PATENT DOCUMENTS

| | | | |
|---|---|---|---|
| EP | 0 903 743 A | 3/1999 | |
| EP | 0 973 333 A | 1/2000 | |

(Continued)

OTHER PUBLICATIONS

U.S. Appl. No. 13/302,852, filed Nov. 22, 2011, Non-Final Rejection mailed May 23, 2013, 19 pages.

(Continued)

*Primary Examiner* — Nathan Flynn
*Assistant Examiner* — William J Kim
(74) *Attorney, Agent, or Firm* — Kilpatrick Townsend & Stockton LLP (57) ABSTRACT

A method for displaying content stored in a block of multiplexed content, the multiplexed content including a plurality of instances of content where each instance of content includes an associated content identifier, the method including receiving, at a content receiver, content identifying information for the content and instructions for displaying the content, determining a selected content identifier based on the content identifying information, selecting the block from one or more blocks based on the selected content identifier, scanning the block for a content identifier and encountering the content identifier, comparing the encountered content identifier to the selected content identifier, and processing an instance of content associated with the encountered content identifier where the encountered content identifier corresponds to the selected content identifier. A system for displaying and a system for storing multiplexed content are also described.

12 Claims, 4 Drawing Sheets

(56) References Cited

U.S. PATENT DOCUMENTS

| | | |
|---|---|---|
| 5,488,658 A | 1/1996 | Hirashima |
| 5,541,738 A | 7/1996 | Mankovitz |
| 5,642,153 A | 6/1997 | Chaney et al. |
| 5,684,969 A | 11/1997 | Ishida |
| 5,805,763 A | 9/1998 | Lawler et al. |
| 5,974,218 A | 10/1999 | Nagasaka et al. |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | Mcneely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,774,608 B2 | 7/2014 | Kummer et al. |
| 8,819,722 B2 | 8/2014 | Kummer et al. |
| 8,850,476 B2 | 9/2014 | VanDuyn et al. |
| 2001/0028782 A1 | 10/2001 | Ohno et al. |
| 2001/0033736 A1 | 10/2001 | Yap et al. |
| 2001/0034787 A1* | 10/2001 | Takao et al. ............ 709/231 |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0188943 A1 | 12/2002 | Freeman et al. |
| 2003/0026423 A1 | 2/2003 | Unger et al. |
| 2003/0110514 A1 | 6/2003 | West et al. |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2004/0001087 A1 | 1/2004 | Warmus et al. |
| 2004/0015992 A1 | 1/2004 | Hasegawa et al. |
| 2004/0015999 A1 | 1/2004 | Carlucci et al. |
| 2004/0103428 A1 | 5/2004 | Seok et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0120049 A1* | 6/2005 | Kanegae et al. ......... 707/104.1 |
| 2005/0125683 A1 | 6/2005 | Matsuyama et al. |
| 2005/0229213 A1 | 10/2005 | Ellis et al. |
| 2005/0271365 A1 | 12/2005 | Hisatomi |
| 2006/0056800 A1 | 3/2006 | Shimagami et al. |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0274208 A1 | 12/2006 | Pedlow |
| 2007/0016546 A1* | 1/2007 | De Vorchik et al. ............ 707/1 |
| 2007/0039032 A1 | 2/2007 | Goldey et al. |
| 2007/0061378 A1 | 3/2007 | Lee et al. |
| 2007/0157253 A1 | 7/2007 | Ellis et al. |
| 2007/0165855 A1 | 7/2007 | Inui |
| 2007/0192586 A1 | 8/2007 | McNeely |
| 2007/0204288 A1 | 8/2007 | Candelore |
| 2007/0234395 A1 | 10/2007 | Dureau et al. |
| 2007/0258596 A1 | 11/2007 | Kahn et al. |
| 2008/0046929 A1 | 2/2008 | Cho et al. |
| 2008/0092164 A1 | 4/2008 | Agarwal et al. |
| 2008/0104534 A1 | 5/2008 | Park et al. |
| 2008/0137850 A1 | 6/2008 | Mamidwar |
| 2008/0141322 A1* | 6/2008 | Jang et al. ............ 725/114 |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2010/0020794 A1 | 1/2010 | Cholas et al. |
| 2010/0037282 A1 | 2/2010 | Iwata et al. |
| 2010/0050225 A1* | 2/2010 | Bennett ............ 725/144 |
| 2010/0086277 A1 | 4/2010 | Craner |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0158479 A1* | 6/2010 | Craner ............ 386/92 |
| 2010/0158480 A1 | 6/2010 | Jung et al. |
| 2010/0169926 A1 | 7/2010 | Westberg et al. |
| 2010/0195827 A1 | 8/2010 | Lee et al. |
| 2010/0239228 A1 | 9/2010 | Sano |
| 2010/0247067 A1 | 9/2010 | Gratton |
| 2010/0265391 A1 | 10/2010 | Muramatsu et al. |
| 2010/0284537 A1 | 11/2010 | Inbar |
| 2010/0313222 A1 | 12/2010 | Lee et al. |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0131413 A1 | 6/2011 | Moon et al. |
| 2011/0138169 A1 | 6/2011 | Michel |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0255002 A1 | 10/2011 | Witheiler |
| 2011/0311045 A1 | 12/2011 | Candelore et al. |
| 2012/0278837 A1 | 11/2012 | Curtis et al. |
| 2012/0296745 A1 | 11/2012 | Harper |
| 2012/0311534 A1 | 12/2012 | Fox et al. |
| 2012/0311634 A1 | 12/2012 | Van Duyn et al. |
| 2013/0014146 A1 | 1/2013 | Bhatia et al. |
| 2013/0051555 A1 | 2/2013 | March et al. |
| 2013/0051758 A1 | 2/2013 | Kummer et al. |
| 2013/0051764 A1 | 2/2013 | Casagrande |
| 2013/0051766 A1 | 2/2013 | March et al. |
| 2013/0051773 A1 | 2/2013 | Casagrande |
| 2013/0054579 A1 | 2/2013 | Kennedy |
| 2013/0055304 A1 | 2/2013 | Kirby et al. |

(56) References Cited

U.S. PATENT DOCUMENTS

| | | |
|---|---|---|
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/028824 A3 | 2/2013 |
| WO | 2013/138606 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2012/052011 mailed Dec. 17, 2012, 44 pages.
Jung, J., et al., "Design and Implementation of a Multi-Stream CableCARD with a High-Speed DVB-Common Descrarnbler," ACM Multimedia, 2006, 4 pages.
U.S. Appl. No. 13/286,157, filed Oct. 31, 2011, Non-Final Office Action mailed Jan. 17, 2013, 20 pages.
U.S. Appl. No. 13/215,702, filed Aug. 23, 2011, Notice of Allowance mailed Feb. 11, 2013, 13 pages.
U.S. Appl. No. 13/324,831, filed Dec. 13, 2011 Non-Final Office Action mailed Feb. 28, 2013, 23 pages.
U.S. Appl. No. 13/292,047, filed Nov. 8, 2011 Non-Final Office Action mailed Jan. 18, 2013, 17 pages.
U.S. Appl. No. 13/614,899, filed Sep. 13, 2012 Non-Final Office Action mailed Feb. 5, 2013. 17 pages.
U.S. Appl. No. 13/291,014, filed Nov. 7, 2011 Non-Final Office Action mailed Mar. 29, 2013, 21 pages.
Author Unknown, "Move Networks is Delivering the Next Generation of Television," Move Networks, 2010, obtained online at http://www.movenetworks.com/, 2 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
U.S. Appl. No. 13/149,852, filed May 31, 2011, Non-Final Office Action mailed Dec. 12, 2012, 9 pages.
U.S. Appl. No. 13/215,916, filed Aug. 23, 2011 Notice of Allowance mailed Jan. 4, 2013.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/288,002, filed Nov. 2, 2011, Non-final Office Action mailed Sep. 26, 2013, 15 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011, Notice of Allowance mailed Sep. 4, 2013, 22 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Notice of Allowance mailed Aug. 7, 2013, 16 pages.
U.S. Appl. No. 13/291,014, filed Nov. 7, 2011, Notice of Allowance mailed Jun. 20, 2013, 15 pages.
U.S. Appl. No. 13/215,598, filed Aug 23, 2011, Final Office Action mailed Nov. 21, 2013, 23 pages.
U.S. Appl. No. 13/215,598, filed Aug 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug 23, 2011, Final Office Action mailed Dec. 18, 2013, 20 pages.
U.S. Appl. No. 13/592,976, filed Aug. 23, 2012, Notice of Allowance mailed Oct. 7, 2013, 18 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office Action mailed Oct. 25, 2013, 79 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> *Chapter: "How a disk works", Section "The original problem". Retrieved on Jan. 9, 2014, 70 pages.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013. 7 pages.
International Preliminary Report on Patentability for PCT/US2012/052002 mailed on Apr. 17, 2014, 10 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.

(56) References Cited

OTHER PUBLICATIONS

International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
U.S. Appl. No. 13/288,002, filed Nov. 2, 2011, Final Office Action mailed Mar. 27, 2014, 20 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Notice of Allowance mailed Apr. 23, 2014, 141 pages.
International Search Report and Written Opinion of PCT/US2013/031432 mailed Sep. 25, 2014, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013 Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.

* cited by examiner

STORING AND READING MULTIPLEXED CONTENT

CROSS-REFERENCE TO RELATED APPLICATIONS

The present application claims the benefit under 35 U.S.C. §119(e) of U.S. Provisional Patent Application No. 61/526,581, which was filed on Aug. 23, 2011, and entitled "Storing and Reading Multiplexed Content," which is incorporated by reference into the present application in its entirety.

FIELD OF THE INVENTION

The present application relates generally to grouping, transmitting, storing, and providing access to information. More particularly, the present application relates to grouping, storing, transmitting, and providing access to audiovisual content. Still more particularly, the present application relates to grouping audiovisual content based on selected television channels and selected times, transmitting the content for all selected channels covering the selected time, and providing access to any of the selected channels for any time within the selected times.

SUMMARY

In one embodiment, a method for displaying content stored in a block of multiplexed content may be provided. The method may be suitable where the multiplexed content includes a plurality of instances of content and each instance of content includes an associated content identifier. The method may include receiving, at a content receiver, content identifying information for the content and instructions for displaying the content. The method may also include determining a selected content identifier based on the content identifying information and selecting the block from one or more blocks based on the selected content identifier. The method may further include scanning the block for a content identifier and encountering the content identifier and comparing the encountered content identifier to the selected content identifier. The method may also include processing an instance of content associated with the encountered content identifier where the encountered content identifier corresponds to the selected content identifier.

In another embodiment, a system for displaying content stored in a block of multiplexed content may be provided. The system may be suitable for use where the block of multiplexed content includes a plurality of instances of content and each instance of content includes an associated content identifier. The system may include a computer readable storage medium having the block of multiplexed content stored thereon and a processor in communication with the storage medium. The system may also include block selection module accessible by the processor and including block identifiers associated with content identifiers stored in respective blocks. The system may also include a content identifier selection module accessible by the processor and including content identifiers associated with content identifying information relating to the plurality of instances of content.

In still another embodiment, a system for storing a block of multiplexed content, may include a content receiver. The content receiver may include a tuner for tuning to a selected frequency for receiving the multiplexed content, a computer readable storage medium for storing the multiplexed content, and a processor for controlling the tuner and facilitating the storage of the multiplexed content. The computer readable storage medium may include computer implemented instructions stored thereon for processing by the processor. The computer implemented instructions may define a plurality of operations, including receiving the multiplexed content, storing the multiplexed content in the computer readable storage medium in multiplexed form, storing content identifiers together with the multiplexed content, and storing a block identifier identifying the block of multiplexed content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
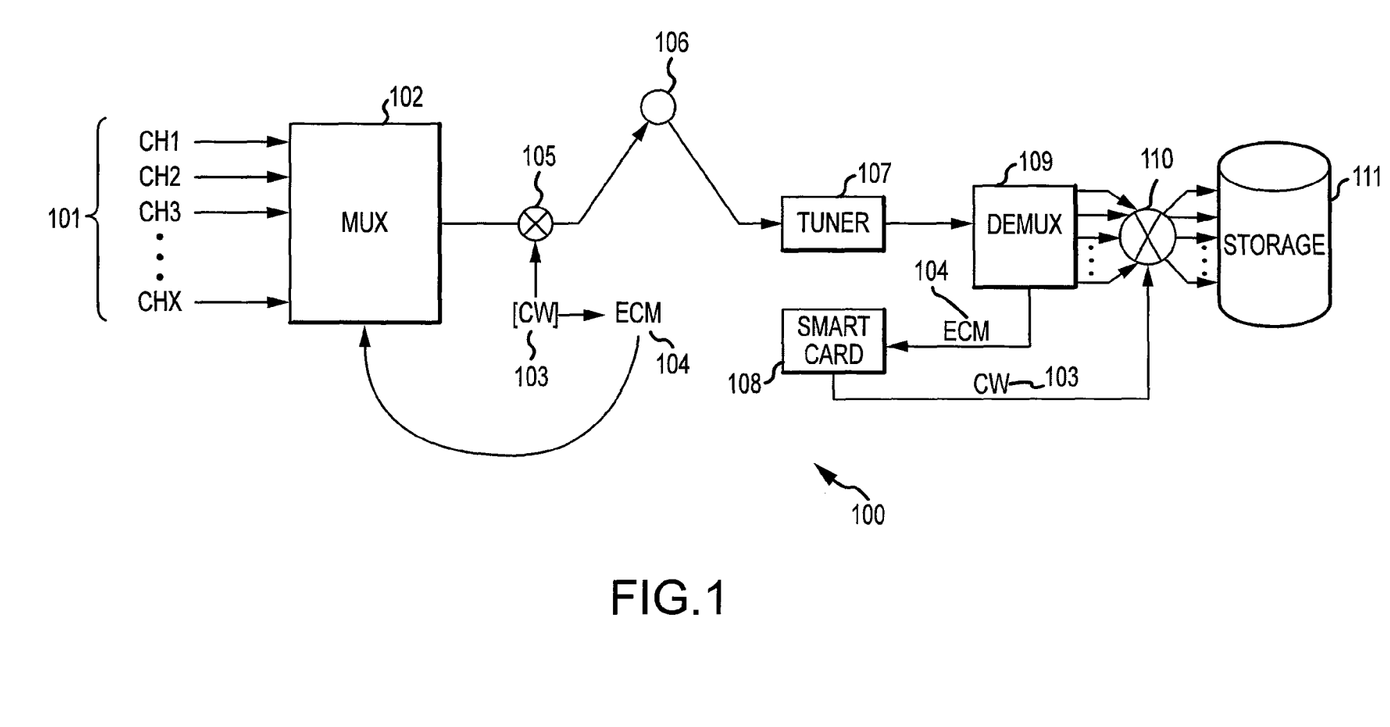
FIG. 1 is a schematic diagram of a system according to some embodiments.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the control word prior to multiplexing. In another example, in some implementations, the data received via the tuned frequency may be descrambled utilizing the control word before being demultiplexed. In yet another example, in various implementations, the multiple instance of content may be re-encrypted before being stored in the non-transitory storage medium 111. In still another example, in one or more implementations, the multiple instance of content may not be decrypted by the smart card before being stored in the non-transitory storage medium and may instead be decrypted upon playback.

Figure 2:
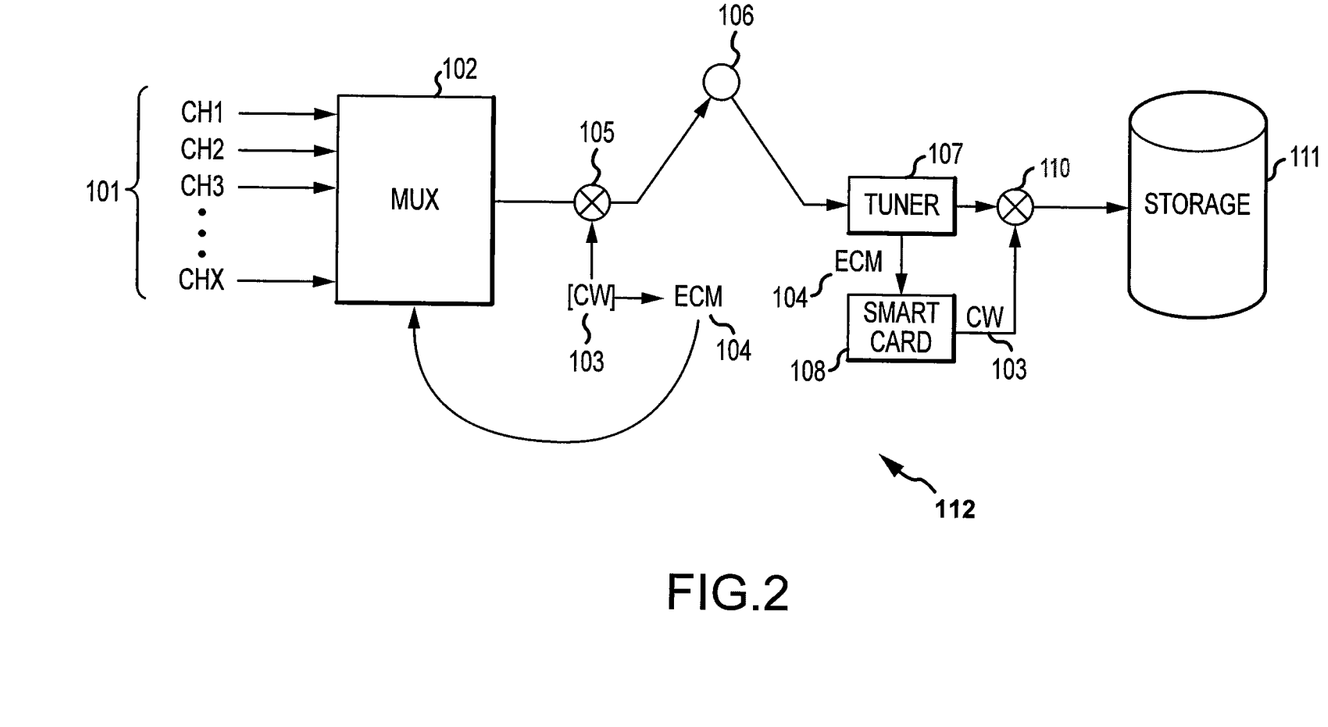
FIG. 2 is a schematic diagram of a system according to another embodiment.

In still other embodiments, as shown in FIG. 2, a system 112 may be provided where the demultiplexing operation and thus the demultiplexer 109 may be omitted. That is, as described above, the ECM may be provided to a smartcard 108 which may decrypt the ECM to obtain the CW 103 and the data received via the tuned frequency may be descrambled by a descrambler 110 utilizing the CW 103. However, the multiplexed data may then be stored in a computer readable storage medium 111 in its multiplexed form. That is, the content stream may remain multiplexed and the multiple instances of content may be stored in multiplexed form rather than separating out the several instances of content and storing related instances of content in groups of associated content.

In the context of the primetime television discussed above, this may include storage of content relating to television programming on four different channels, for example, from seven PM to ten PM on a given day. The information stored may not be demultiplexed into separate files associated with the four channels or into separate files associated with the particular programs on those channels. Rather, a single block of information may be stored and may include data relating to all four channels arranged in multiplexed form as received from the combiner, for example.

Figure 3:
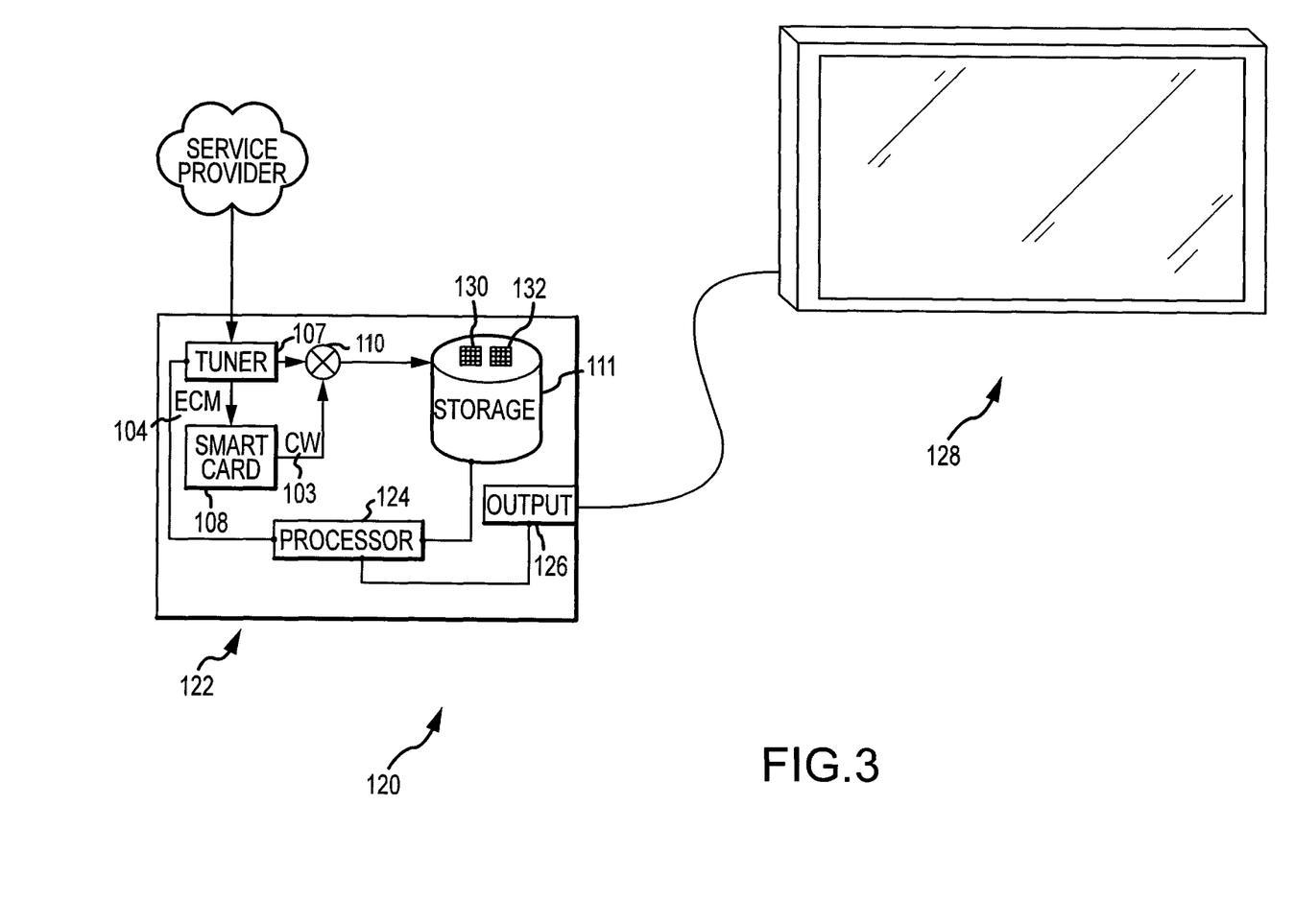
FIG. 3 depicts a system including portions of the system of FIG. 2 and several additional devices.

As shown in FIG. 3, a system 120 may be provided and may include devices having parts or portions of the system 112 included therein. For example, as shown, the system 120 may include a content receiver 122 having a tuner 107, a descrambler 110, a smartcard 108, and a computer readable storage medium 111. The content receiver 122 may also include a computer processor 124 in communication with the tuner 107 and the storage medium 111 for controlling the tuner 107 and accessing information from or sending information to the storage medium 111. An output 126 may also be provided in communication with the processor 124 for receiving content from the processor and transmitting the content to the presentation device 128.

Figure 4:
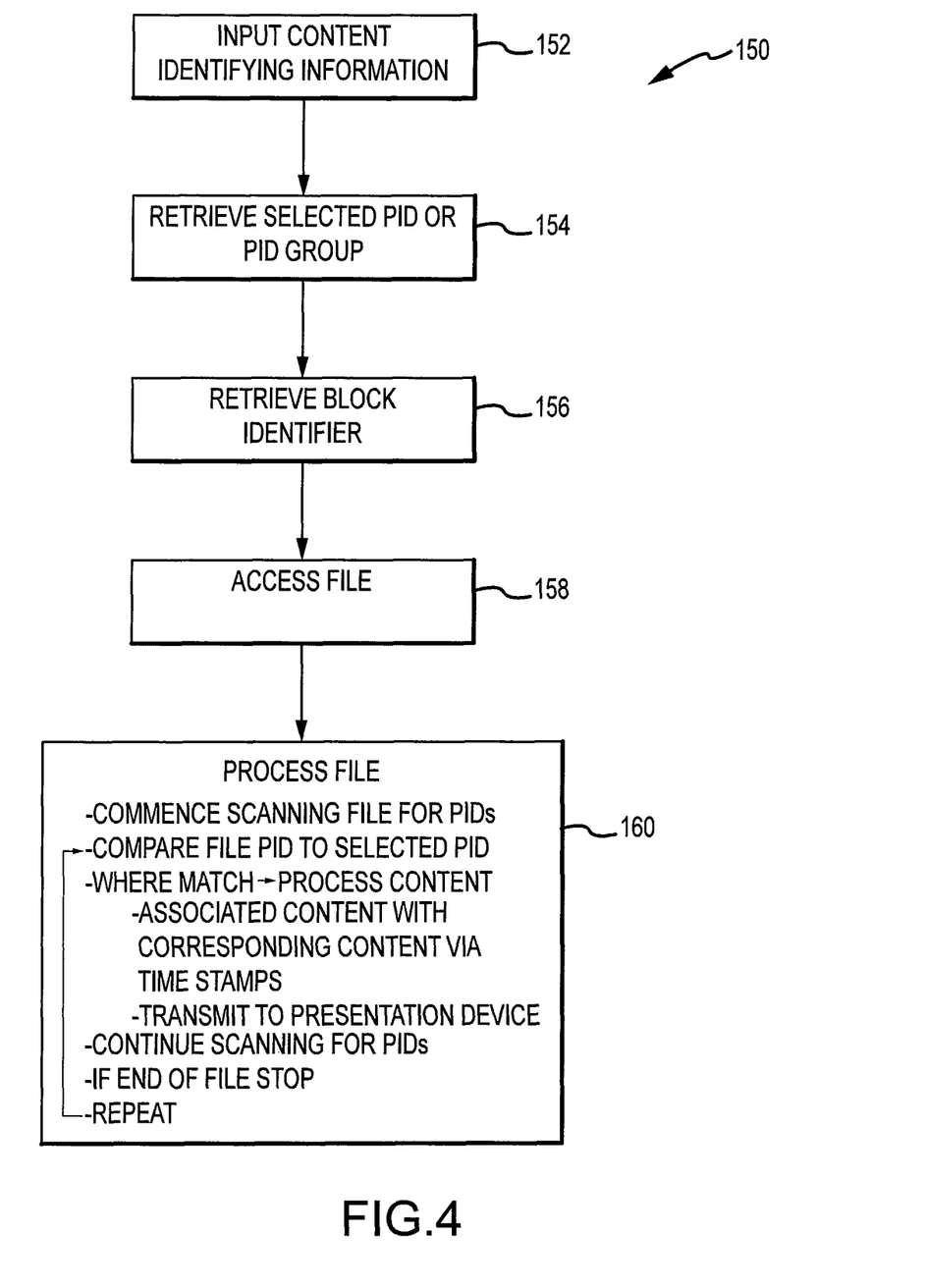
FIG. 4 is a flow chart depicting a method of processing multiplexed content.

The system 120 may perform the method 150 shown in FIG. 4, for accessing and displaying the multiple instances of content. Before describing the method, some discussion is provided with respect to identifiers used in the method. That is, for purposes of accessing and displaying the multiple instances of content stored in the block of content, several identifiers may be provided. In some embodiments, block identifiers may be provided for distinguishing one or more blocks of multiplexed content from one another. Additionally, content identifiers may be provided for distinguishing the multiple instances of content within a block from one another. Still further, content identifying information may be provided that is recognizable by a user for use in selecting content.

Each of the mentioned identifiers (i.e., block identifiers, content identifiers, and content identifying information) may now be described. The stored multiplexed information, or block, may be provided with a block identifier. That is, for example, where the block is stored as a file, a file name may be provided or, where a particular file is not established, a header or other identifier of the block may be provided. In some embodiments, the block identifier may reflect the date, time, type of data, or other indication of the stored content. For example, in the context of the primetime channel recording discussed above, the block identifier may include an indication of the primetime-type recording and the date of the recording. Accordingly, a file with a name such as primetime03152011 may reflect that the file contains a block of data including all of the primetime television programs from Mar. 15, 2011. Other formats and family conventions may also be used.

In addition to block identification, content identifiers may also be provided relating to the content stored within the block and may be stored with each instance of content for use in later extracting selected content from the block. Content identifiers may be configured for the particular environment where the content is stored. For example, the content identifiers may be the same content identifiers used in the above-described multiplexing process. As such, the content identifiers may be in the form of PIDs or groups of PIDs used for multiplexing, transmitting, and demultiplexing content. The PIDs or groups of PIDs may, thus, be associated with a particular channel, for example, and may also be associated with a particular time that the content aired on that channel.

In some embodiments, multiple stages of multiplexing may occur and a given instance of content may include audio, video, and data. When these portions of content are multiplexed, they may each be associated with a PID. This multiplexed audio, video, and data stream may be further multiplexed with another previously multiplexed audio, video, and data stream where each portion of the previously multiplexed stream is also associated with a PID. The two previously multiplexed streams may each be given an additional PID. As such, a primary PID may define a content group of audio, visual, and data each having secondary PIDs associated therewith. Greater or lesser numbers of stages of multiplexing may be used and PIDs may be associated with the content at each stage. Accordingly, in the context of television content, a television program may thus define a plurality of PIDS. That is, for a given program, each instance of audio, visual, and data, may each have a PID. In addition, each multiplexed group of audio, visual, and data, may also have a PID. As such, in searching for instances of content for a particular television program, a search and scan for a group of PIDs may be used to identify instances of content relevant to the program.

In addition to block identification and content identifiers, content identifying information may also be stored. The content identifying information may be information familiar to a user and be configured for distinguishing selected content from other content stored in the system. As such, the content identifying information may be used to identify the selected content and lookup, track, or otherwise determine additional information associated with the content that may be less familiar to the user. For example, in one embodiment, the content identifying information may be used to retrieve a content identifier in the form of a PID or group of PIDs.

In accordance with the above, the content identifying information may include any identifying information such as a file name, an index listing, or other information for use in identifying content amidst a grouping of content. In the context of television programming, for example, content identifying information may include information commonly provided by one or more program guides such as an electronic program guide (EPG), stored content menu, or other user interface for selecting programs. As such, the content identifying information may include a program name and a date and time of airing, for example. In other embodiments, the content identifying information may include a television channel on which the content aired and the time of airing. In still other embodiments, the content identifying information may include a program name and an episode name or other identifier distinguishing an episode from other episodes of the same program.

Some of the described identifiers may be provided with the incoming content stream that is stored in the block and other identifiers may be provided or retrieved from other content streams. For example, in the context of television programming, identifying information or identifiers may be provided with a stream of content associated with an electronic programming guide (EPG). That is, in addition to content identifying information, content identifiers such as PIDs may also be provided with the EPG transmission to indicate what PID or group of PIDs will be used for transmitting and storing content.

The identifiers and other identifying information may be received by the content receiver 122 and, for purposes of later extraction of some or all of the multiple instances of content in one or more blocks, some indexing processes may be performed. For purposes of searching or scanning for blocks, a block selection module 130 in the form of a table or otherwise arranged file may be created and stored having block identifiers associated with the one or more content identifiers stored therein. Accordingly, this block selection module 130 may be used to determine which block or blocks have content associated with a given content identifier. For purposes of searching within a given block, a content identifier selection module 132 in the form of a table or otherwise arranged file may be created and stored having content identifiers associated with content identifying information. This content identifier selection module 132 may be used to retrieve content identifiers associated with selected content. These modules 130, 132 may be produced as the content stream is received and may be available for accessing or reading immediately. That is, the module 130, 132 may be updated, for example, as each instance of content is received having and associated content identifier. The processor 124 may analyze the incoming content stream and each time a content identifier is encountered, the processor 124 may store the content identifier in the modules 130, 132. The processor 124 may store the content identifier in a list, for example, in the block selection module 130. For the content identifier selection module 132, the processor 124 may store the content identifier with the content identifying information of the associated content in the stream. The modules 130, 132 may each be accessible while a block of data is being received such that programs may be accessed while the block is being stored to avoid having to wait for the whole block to stored. In some cases, some of the data in the modules 130, 132 may be populated ahead of time based on information available in an EPG, for example, or information actively sent by a service provider for purposes of populating the modules 130, 132.

Having described the system 122 for accessing and displaying the multiple instances of content, the arrangement of the stored multiple instances content, and the identifying information associated therewith, the method 150 of accessing and displaying the multiple instances of content may be described.

With reference to FIG. 4, a flow chart of the method 150 for accessing and displaying the multiple instances of content is shown. The method 150 may include receiving content identifying information 152 for the content and instructions for displaying the content. A content identifier or PID, or group of PIDs, may be determined 154 from the content identifying information. A multiplexed block may be selected 156 based on the content identifiers being search for and the block may be accessed 158 and scanned 160 for the content identifiers. Where corresponding identifiers are found, the associated content may be processed.

Content identifying information may be received 152 from a user. The content identifying information may be received 152 when a user selects a television program from a menu. The menu may be arranged in one of several different ways, such as by channel and time, alphabetically by program name, or some other organizational pattern. In any of these cases, the selection of content by the user via a selection button on a remote control, or other selection mechanism, may provide the content identifying information.

The content identifier or group of content identifiers may be retrieved 154 based on the content identifying information. That is, the content identifier selection module 132 may be accessed by the processor 124 with the content identifying information. The content identifier selection module 132 may be used to look up the content identifiers associated therewith. For example, content identifying information including a channel, a date, and a time, may be used to access the content identifier selection module 132 and determine the PID or group of PIDs associated with the program.

In some embodiments, the content identifiers may be stored in the one or more selection menus available to a user. As such, selection of content by a user may automatically lead to the associated content identifiers and the step of accessing a content identifier selection module 132 may not be required.

The system may also retrieve 156 a block identifier. That is, while the system may have a content identifier or group of content identifiers, it may not have information regarding which block the content is stored in. Accordingly, the processor 124 may access the block selection module 130 and lookup or scan the module 130 to determine which block the content identifiers may be found in.

The processor 124 may then access 158 the block and begin scanning 160 the block of content for content identifiers associated with the selected content (i.e., selected content identifiers). As the block is scanned and content identifiers are encountered, the encountered content identifiers may be compared to the selected content identifiers. Where the encountered content identifiers do not match or correspond to the selected content identifiers, the processor 124 may scan for additional content identifiers. Where the encountered content identifiers do match or correspond to the selected content identifiers, the content in the block associated with the encountered content identifier may be processed. The processor may continue to scan the block for content identifiers and may continue to process content associated with encountered identifiers that match or correspond to the selected content identifiers. The processor 124 may continue this process until it reaches the end of the block.

Processing the content may include reading the content from the storage medium, synchronizing the content with related content, and transmitting the content to a presentation device. That is, the multiplexed nature of the multiple instances of content in the block may be such that several pieces of selected content are re-assembled prior to transmitting to a presentation device. The synchronizing process may involve re-assembling the content based on content identifiers, but also based on time stamps, for example. In the context of television programming for example, a given instance of content may include audio, visual, and/or data components, for example. Each audio, visual, or data instance of content may include a time stamp for use in coordinating the portions and assuring that the program presents in a coordinated fashion. In addition, each group of audio, visual, and data, (i.e., once re-assembled based on time) may be re-assembled and sequenced with other groups of audio, visual, and data such that the stream of content for displaying a program is re-assembled. The processor may conduct these operations and transmit the content to a presentation device for viewing.

At least one advantage associated with the system and method described above is that, by not de-multiplexing the data at the time of storing the data, wear may be avoided on the storage medium. That is, for example, if the content was de-multiplexed and a hard drive was used as a storage medium, the heads on the hard drive may move back and forth between transcription locations as the data is received and written to disc. That is, for example, the writing heads may transcribe content for a given channel in one location and be interrupted and move to another location for transcribing content for another channel. When content for the original channel is received, the heads may move back to the original location to transcribe additional content for the original channel. This process of writing the data to disk may cause the storage medium or device to wear out relatively quickly and may lead to transcription errors. Additionally, the movement of the heads may be a slower operation than the transcription of content. As such, storage of data that requires movement of the writing heads may have a slower performance than storage of data that does not require movement of the writing heads. However, in the system described herein, the storage medium may be able to write the incoming stream of content to disc without moving back and forth between transcription locations and the data may still be usable for presenting content.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM);

random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for displaying content stored in a block of multiplexed content, the multiplexed content including a plurality of instances of content wherein each instance of content includes an associated content identifier, the method comprising:
   receiving, at a content receiver, content identifying information for the content in association with a request to present the content;
   determining a selected content identifier based on the content identifying information, wherein the selected content identifier comprises a packet identifier;
   selecting the block from a plurality of blocks based on the selected content identifier, wherein selection of the block comprises:
      determining which block to select by accessing a block selection module; and
      searching a table of the block selection module for the selected content identifier and returning a block identifier, wherein the table relates a plurality of content identifiers with a plurality of block identifiers;
   scanning the block for a content identifier and encountering the content identifier;
   comparing the encountered content identifier to the selected content identifier; and
   processing an instance of content associated with the encountered content identifier where the encountered content identifier corresponds to the selected content identifier, wherein processing the instance of content comprises:
      determining a time stamp associated with the instance of content; and
      synchronizing the instance of content with other instances of content having a matching time stamp to create a portion of the content.

2. The method of claim 1, wherein processing the instance of content comprises sequencing the portion of content with other portions of content.

3. The method of claim 1, wherein the multiplexed instances of content include audio instances of content and video instances of content and the portion of content includes synchronized audio and visual content.

4. The method of claim 1, wherein the content identifiers include packet identifiers.

5. The method of claim 1, wherein determining a selected content identifier includes accessing a content identifier selection module.

6. The method of claim 5, wherein determining a selected content identifier further comprises searching the content identifier selection module for the content identifying information and returning the selected content identifier.

7. The method of claim 1, wherein selecting the block includes selecting the block based on the block identifier.

8. The method of claim 1, further comprising repeating the scanning, comparing, and processing operations to assemble the content.

9. The method of claim 1, further comprising:
   updating, by the content receiver, the block selection module in response to content stream being stored, such that one or more content identifiers associated with the content stream are added to the table of the block selection module.

10. A system for accessing content stored in a block of multiplexed content, the block of multiplexed content including a plurality of instances of content wherein each instance of content includes an associated content identifier, the system comprising:
   a non-transitory computer readable storage medium having a plurality of blocks of multiplexed content stored thereon, wherein the plurality of blocks of multiplexed content comprises the block of multiplexed content;
   a processor in communication with the non-transitory computer readable storage medium;
   a block selection module accessible by the processor and including block identifiers associated with content identifiers stored in respective blocks of the plurality of blocks of multiplexed content; and
   a content identifier selection module accessible by the processor and including content identifiers associated with content identifying information relating to the plurality of instances of content;
   wherein the non-transitory computer readable storage medium includes computer implemented instructions stored thereon defining operations, the operations comprising:
      receiving content identifying information;
      accessing the content identifier selection module and using the content identifying information to select a content identifier;
      accessing the block selection module and using the selected content identifier to select the block of multiplexed content, wherein accessing the block selection module comprises:
         searching a table of the block selection module for the selected content identifier and returning a block identifier, wherein the table relates a plurality of content identifiers with a plurality of block identifiers;
      scanning the block identified by the block identifier for content identifiers matching the selected content identifier; and
      processing multiple instances of content each associated with the matching content identifiers to assemble the content, wherein said operation of processing multiple instances of content each associated with the matching content identifiers to assemble the content further comprises:

determining a time stamp associated with each instance of content of the multiple instances of content associated with the matching content identifiers; and synchronizing the instances of content of the multiple instances that have matching time stamps to assemble the content.

11. The system of claim 10, further comprising transmitting the assembled content to at least one presentation device.

12. The system of claim 10, wherein the block of multiplexed content includes audio instances of content and video instances of content and the content includes synchronized audio and visual content.

* * * * *